Figure 1:
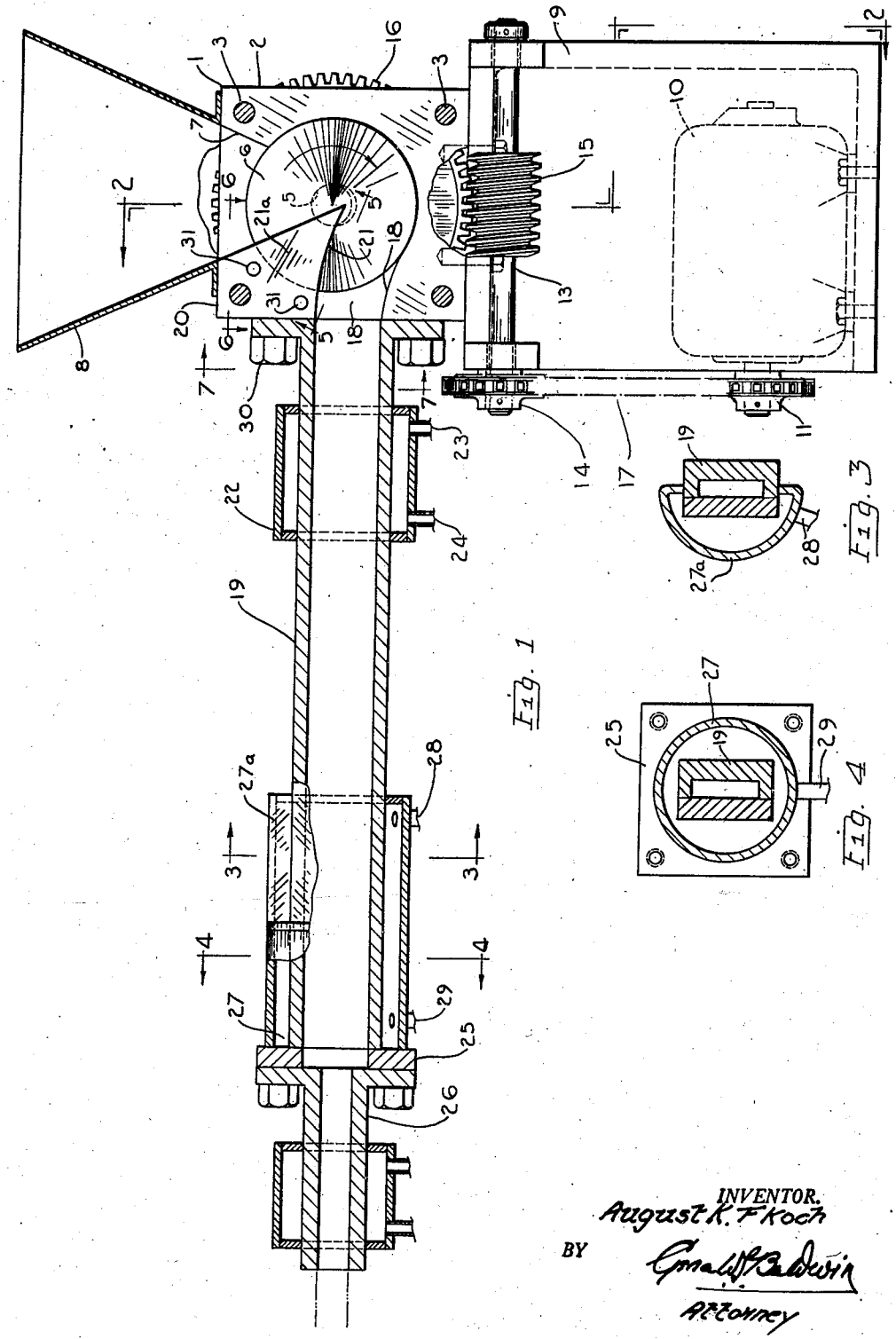

Aug. 26, 1947.  A. K. F. KOCH  2,426,457
PLASTIC MACHINE
Filed March 7, 1945  2 Sheets-Sheet 2

INVENTOR.
August K. F. Koch
BY
Gerald F. Baldwin
ATTORNEY.

Patented Aug. 26, 1947

2,426,457

UNITED STATES PATENT OFFICE 2,426,457

PLASTIC MACHINE

August K. F. Koch, Detroit, Mich.

Application March 7, 1945, Serial No. 581,485

4 Claims. (Cl. 18—12)

1

This invention relates to improvements in plastic machines, and relates to a machine into which powdered or granular plastic material is fed, and from which a continuous stream of viscous plastic material is discharged into or through a die at a uniform temperature and at a uniformly high pressure so that the structure of the plastic material and the article, or articles, made therewith remains constant.

At the present time it is customary to employ a piston in a cylinder for forcing the plastic material into or through a die, but when such a mechanism is used the maximum amount of material that can be delivered in one continuous stream into or through the die is of course dependent upon the size of the cylinder and the stroke of the piston. Moreover when a piston is employed the pressure exerted upon the material on consecutive strokes of the piston is not always the same.

This invention aims, among other things, to provide a light and simple form of plastic machine by which a uniformly high pressure is exerted upon the material as it is discharged in a viscous stream at a constant temperature into or through the die; wherein means are provided for compressing the plastic material so that practically all air is extracted therefrom before heat is applied thereto; wherein means are provided for preventing the retention of air bubbles within the material as it becomes viscous; and wherein means are provided for preventing any material heating of the plastic material at the rear end of the stream where pressure is being exerted thereon when in a substantially powdered or granular state.

Another object of the invention is to provide a plastic machine which requires only a small amount of powder to operate it, and which includes two driven discs having opposed conical faces so arranged that two opposite radial portions of the faces are parallel and somewhat spaced from one another while the diametrically opposed portions of these faces are outwardly inclined from one another toward their peripheries. Consequently material fed between the discs is gradually compressed as the radial position at which portions of the discs are parallel is approached by the said material after which the latter is discharged through a delivery duct. In order to insure the travel of the material from between the discs into the duct a plow member is provided between the said discs.

A further object of the invention is to provide such a plastic machine wherein means are provided around the delivery duct both for heating the plastic material and rendering it viscous prior to its discharge therefrom, and also for preventing heat being transmitted back along the stream of material as it is forced forward and thus prevent heating of the material adjacent the discs. Moreover the heating means is so arranged that it is first applied from one side only of the duct so that any air in the material as it becomes viscous will travel to and along the opposite or cool side of the duct and thus prevent the formation of air bubbles in the material being forced into or through a die.

Figure 2:
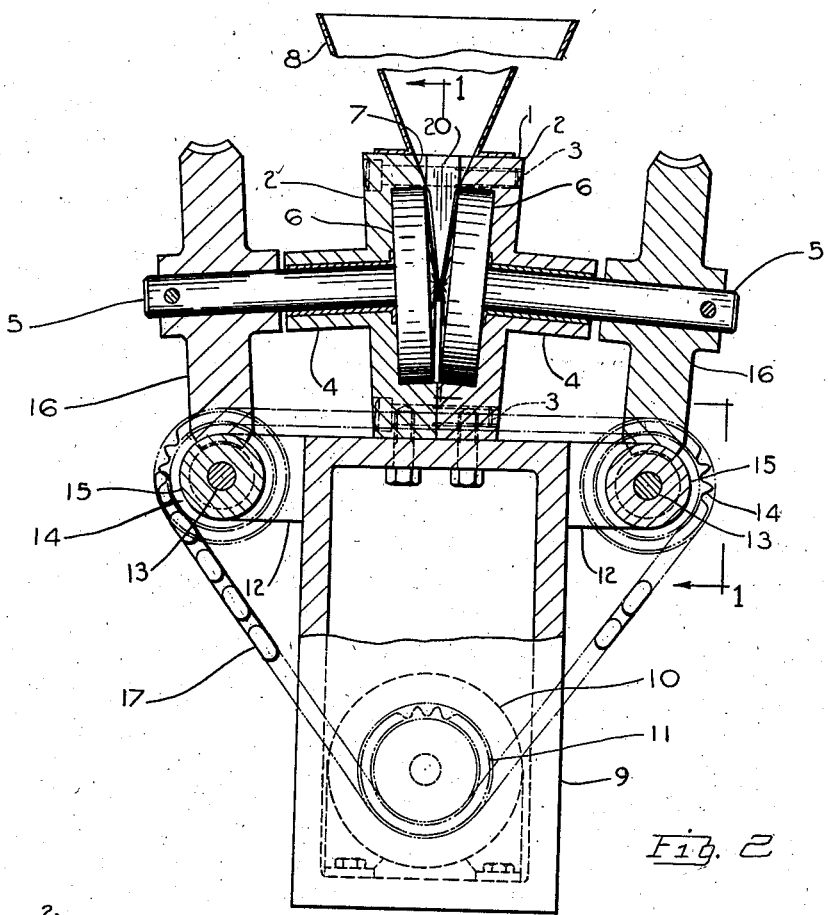
Figure 7:
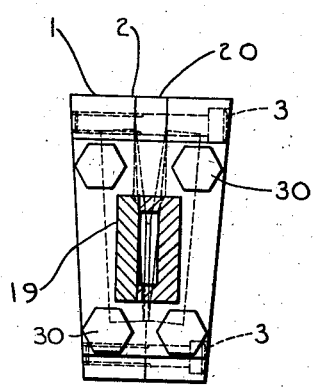
Figure 6:
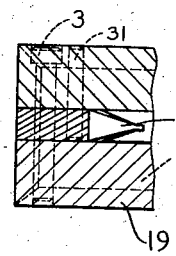
Figure 5:
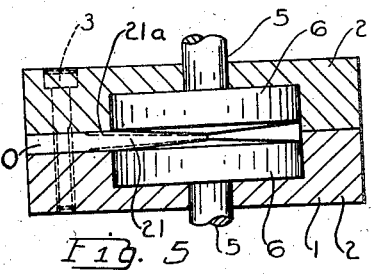

Having thus briefly and broadly stated some of the objects and advantages of the invention I will now describe it with the aid of the accompanying drawings, in which:

Figure 1 is a side view of the invention partly in section and taken on the line 1—1 of Figure 2, and Figure 2 is an end view, partly in section, taken on the line 2—2 of Figure 1.

Figures 3, 4, 5, 6 and 7 are sections on the lines 3—3, 4—4, 5—5, 6—6 and 7—7 respectively of Figure 1.

Referring to the drawings, 9 designates a suitable supporting frame on which a housing 1 is mounted, which is divided vertically and longitudinally into two parts 2 secured to one another by means of screws 3. Provided on and projecting outwardly from each of the parts 2 is a suitable bearing 4 to support a shaft 5 for rotation. These two shafts while in the same vertical plane are downwardly and outwardly inclined. Secured on the shafts 5 within the housing 1 are discs 6 the adjacent faces of which are conical while their outer faces are flat and rotate substantially in contact with the inner walls of the housing. The cone angle of the adjacent faces of the discs is the same as the inclination of the shafts 5 to the horizontal so that imaginary lines extending vertically downward across the adjacent faces of the two discs from their axes are parallel and somewhat spaced from one another, while imaginary lines extending vertically upward from their axes are outwardly inclined. Thus as the discs turn in a clockwise direction, Figure 1, the right hand halves moving from top to bottom approach one another and compress material dropped between them. It will also be noted that the diameter of the discs is such that they are a free rotating fit in the body of the housing 1. Extending through the top of the latter and registering with the gap between the upper portions of the discs 6 is an opening 7, and mounted on the housing is a hopper 8 the open under side of which is in registry with the said opening so that granular or powdered plastic material in the hopper is fed by gravity between the two discs 6.

Mounted on the frame 9 is a suitable drive means such as the electric motor 10 having a sprocket wheel 11 thereon. Supported in bearings 12 on the frame 9 are parallel shafts 13 on each of which a sprocket wheel 14 and a worm 15 are secured. Mounted on the outer extremities of the shafts 5 are worm wheels 16 each of which is driven by one of the worms 15, and passing around the sprocket wheel 11 and the two sprocket wheels 14 is a driving chain 17 so that the motor 10 turns both discs 6.

Formed through one end of the housing 1 and at right angles to the axes of the discs 6 is an opening 18 positioned centrally of the two discs and somewhat above the lower halves of the latter. Extending from the housing 1 and secured thereto as by screws 30 is a delivery duct 19 the passage through which is in registry with and substantially the same size as the opening 18. Supported between the two parts 2 of the housing and preferably secured to one of them by dowels 31 is a plow member 20 the edge 21 of which extends between and in contact with portions of the conical faces of both discs 6 along substantially radial lines. The sides 21a of the said plow member are tapered somewhat away from the edge 21 to slightly reduce the width of the plow member behind the latter and thus provide side clearance. Thus upon rotation of the discs material compressed between them cannot continue to travel around between the conical faces but must flow through the opening 18.

Mounted around the duct 19 for a short distance adjacent the housing 1 is an annular cooling chamber 22 having a suitable inlet 23 and outlet 24 through which cold water is circulated to prevent heating of the plastic material passing through that part of the duct since heating would make the plastic material viscous and hinder its delivery by the discs 6. It will be noted that the cross section of the passage through the delivery duct 19 is in this instance rectangular, both high and narrow. While this passage may be of various cross sectional forms it should be materially narrower one way than the other. Secured on the extremity of the delivery duct 19 remote from the housing 1 is a faceplate 25 for attachment of a die 26, of the form required to make the desired product, into or through which the plastic material is forced by rotation of the discs 6, and extending around the duct adjacent the faceplate is a heater casing 27. The latter from its end nearest the faceplate and for a portion of its length completely encircles the duct, and the remainder 27a of this casing which extends toward the cooling chamber 22 is substantially semi-circular in cross section and is so formed that it extends outwardly of one long side only of the duct 19. Suitably connected to the heater casing 27 are an inlet 28 and an outlet 29 so arranged that a heating medium such as hot oil will flow therethrough. The arrangement of the heater casing portion 27a is such that at first the material passing through the passage is subjected to heat from one side only so that any air in the material is driven to the wall of the duct remote from the one through which heat is being applied, that is the air is driven across the narrow way of the passage. Thus as the material becomes viscous no air bubbles remain imprisoned therein as their retention would render articles produced from such material defective. Relative to air in the material it will also be noted that due to the compressing action of the discs practically all air is extracted prior to the passage of the plastic material into the duct.

From the foregoing it will be seen that I have provided a light, compact and simple form of plastic machine which can be operated with a minimum of power, and by which a continuous stream of viscous plastic material of uniform structure can be discharged at a uniform temperature and at an extremely high and uniform pressure. Moreover while the material is primarily intended for plastics it can also be satisfactorily utilized for rubber or rubber compositions, though in most cases that involves slower operation of the machine.

While in the foregoing the preferred embodiment of the invention has been described and shown, it is understood that alterations and modifications may be made thereto provided these alterations and modifications fall within the scope of the appended claims.

What I claim is:

1. A machine of the character described including a housing, two discs mounted for rotation therein the axes of said discs being inclined with respect to one another, said discs having smooth opposed faces which are slightly conical, the discs being relatively so supported that across lines radial in one direction from their axes they are substantially parallel and adjacent one another, and in the opposite direction from their axes they are outwardly inclined from said axes, means drivingly connecting each of said discs for rotating both discs at the same speed, means for feeding plastic material between the portions of the faces which are inclined to one another, said housing having an outlet opening therethrough opposite the portions of the disc faces which are parallel and adjacent one another, a delivery duct extending from the outside of the housing in registry with said opening, and a plow fixedly mounted between the discs and substantially in contact with the opposed work contacting faces of said discs, said plow extending from a point adjacent the vertex of said discs to a point beyond the peripheral edges thereof with its outer end supported by said casing to prevent the transportation of the material between the discs past the outlet opening.

2. The combination set forth in claim 1 wherein the delivery duct adjacent the housing is jacketed to receive a cooling medium to prevent the plastic material becoming fluid adjacent the housing, said delivery duct being rectangular in section to provide a relatively thin flat passageway thereto.

3. The combination set forth in claim 1, wherein the passage through the delivery duct is substantially rectangular in section and has two longer and two shorter sides to provide a relatively flat passageway of thin section, said duct being provided along one longer side with heating means whereby air bubbles in the plastic material are driven against the opposite unheated longer side of said passage.

4. A machine of the character described including a housing, shafts extending through opposite sides of the housing positioned in a common vertical plane, each shaft being somewhat inwardly and upwardly inclined, means drivingly connecting each shaft for turning both the shafts at the same speed, a disc fixed on the inner extremity of each shaft within the housing, the opposed inner faces of the discs being smooth and slightly conical whereby the vertically downward portions of the faces from their axes are parallel and spaced slightly from one another and their vertically upward portions are outwardly inclined from their axes, means for feeding plastic material into the housing between said upward portions of the faces, said housing having a discharge opening therethrough opposite the lower portions of the discs through which the material is adapted to be forced by said discs, and a V-shaped plow fixedly mounted in the housing and extending between the discs from a point adjacent the apexes thereof to a point beyond the peripheral edge of said discs to prevent the travel of the material between the discs past said opening said V-shaped plow being located between the means for feeding material to said housing and said discharge opening.

AUGUST K. F. KOCH.

REFERENCES CITED

The following references are of record in the file of this patent:

UNITED STATES PATENTS

| Number | Name | Date |
|---|---|---|
| 1,936,285 | Bond | Nov. 21, 1933 |
| 2,262,989 | Conklin et al. | Nov. 18, 1941 |
| 1,681,566 | Anderegg | Aug. 21, 1928 |
| 2,375,827 | Slaughter | May 15, 1945 |

FOREIGN PATENTS

| Number | Country | Date |
|---|---|---|
| 13,480 | Great Britain | 1888 |